(12) United States Patent
Smith

(10) Patent No.: US 10,117,003 B1
(45) Date of Patent: Oct. 30, 2018

(54) DISTRIBUTED WILD FIRE ALERT SYSTEM

(71) Applicant: Kyle B. Smith, Dallas, TX (US)

(72) Inventor: Kyle B. Smith, Dallas, TX (US)

( * ) Notice: Subject to any disclaimer, the term of this patent is extended or adjusted under 35 U.S.C. 154(b) by 0 days.

(21) Appl. No.: 15/483,341

(22) Filed: Apr. 10, 2017

Related U.S. Application Data

(63) Continuation of application No. 14/826,981, filed on Aug. 14, 2015, now Pat. No. 9,619,996.

(60) Provisional application No. 62/037,479, filed on Aug. 14, 2014.

(51) Int. Cl.
| | | |
|---|---|---|
| *H04Q 9/00* | (2006.01) | |
| *G08B 17/00* | (2006.01) | |
| *G08B 27/00* | (2006.01) | |

(52) U.S. Cl.
CPC .......... *H04Q 9/00* (2013.01); *G08B 17/005* (2013.01); *G08B 27/001* (2013.01); *H04Q 2209/40* (2013.01); *H04Q 2209/84* (2013.01); *H04Q 2209/886* (2013.01)

(58) Field of Classification Search
CPC .... G08B 27/001; G08B 17/00; G08B 25/016; G08B 25/10
See application file for complete search history.

(56) References Cited

U.S. PATENT DOCUMENTS

| | | | | | |
|---|---|---|---|---|---|
| 8,907,799 | B2* | 12/2014 | McKenna | ............... | G08B 17/06 340/584 |
| 9,146,820 | B2* | 9/2015 | Alfadhly | ............. | G06F 11/2002 |
| 9,619,996 | B1* | 4/2017 | Smith | ....................... | A62C 3/00 |
| 2006/0176169 | A1* | 8/2006 | Doolin | ................... | G08B 17/00 340/521 |
| 2010/0001865 | A1* | 1/2010 | Farrell | .................... | H01L 35/32 340/577 |
| 2010/0332831 | A1* | 12/2010 | Shon | ...................... | H04L 9/0833 713/168 |
| 2011/0001612 | A1* | 1/2011 | Chung | ................... | G08B 25/10 340/286.02 |
| 2011/0105161 | A1* | 5/2011 | Nilsson | ................. | G01S 5/0289 455/500 |
| 2013/0044183 | A1* | 2/2013 | Jeon | ...................... | H04N 19/103 348/43 |
| 2013/0329719 | A1* | 12/2013 | Chung | ................ | H04W 76/046 370/345 |
| 2013/0335566 | A1* | 12/2013 | Coulter | .................. | H04N 7/181 348/144 |
| 2014/0132409 | A1* | 5/2014 | Billman | ................. | G08B 19/00 340/539.1 |
| 2014/0232876 | A1* | 8/2014 | Dougherty | ............... | H04N 5/33 348/165 |

(Continued)

*Primary Examiner* — Erin F Heard
(74) *Attorney, Agent, or Firm* — Frost Brown Todd LLC

(57) ABSTRACT

A system and method for detecting and managing wildfires using fixed sensors is described. The system and method deploy a plurality of fixed sensors in an area to be monitored. Each fixed sensor is operable to detect ambient conditions in the vicinity of the fixed sensor and to relay that information to a central control center. Each fixed sensor dormant until powered by heat from a detected fire allowing the fixed sensor to send data related to the ambient conditions using the transceiver before the sensor device is consumed by the fire. The system can then determine the attributes of the wildfire from the collective data from the plurality of fixed sensors and coordinate the activity of responders in response to the wildfire using the collective data.

20 Claims, 5 Drawing Sheets

(56) References Cited

U.S. PATENT DOCUMENTS

| | | | | |
|---|---|---|---|---|
| 2014/0257862 A1* | 9/2014 | Billman | ............ | G06Q 40/08 |
| | | | | 705/4 |
| 2014/0257864 A1* | 9/2014 | Billman | ............ | G06Q 40/08 |
| | | | | 705/4 |
| 2015/0356686 A1* | 12/2015 | Cook | ............ | G06Q 40/08 |
| | | | | 705/4 |
| 2015/0373553 A1* | 12/2015 | Chiba | ............ | H04W 4/006 |
| | | | | 370/310 |
| 2016/0112854 A1* | 4/2016 | Goossen | ............ | H04W 4/90 |
| | | | | 455/404.2 |

\* cited by examiner

DISTRIBUTED WILD FIRE ALERT SYSTEM

CROSS REFERENCE TO RELATED INFORMATION

This application is a continuation of U.S. patent application Ser. No. 14/826,981, filed Aug. 14, 2015, now U.S. Pat. No. 9,619,996, titled "Distributed Wild Fire Alert System", which claims the benefit of U.S. Provisional Patent Application No. 62/037,479, filed Aug. 14, 2014, titled, "Distributed Wild Fire Alert System", the contents of which are hereby incorporated herein in its entirety.

TECHNICAL FIELD

The present disclosure is directed to a fire detection system, and more specifically to a fire detection system employing mobile and distributed sensors with wireless connectivity.

BACKGROUND OF THE INVENTION

Everyone is familiar with the environmental and social costs of forest fires; in summertime, the prime fire season in the West, there are regular news stories about people losing their homes and thousands of acres ablaze. The economic costs both in lost homes and property and who pays to put the fires out are enormous and growing. As many as 90 percent of wild fires in the United States are caused by humans, according to the U.S. Department of Interior. Some human-caused fires result from campfires left unattended, the burning of debris, negligently discarded cigarettes and intentional acts of arson. The remaining 10 percent are started by lightning or lava.

Severe forest fires have increased in frequency over the past decade, resulting in substantial losses of property and human lives. In 2013, 47,579 wildfires burned over 4 million acres, with California, North Carolina, Oregon, Montana and Arizona experiencing the most wildfires, according to the National Interagency Fire Center. On June 30, 19 firefighters were killed while working to contain the Yarnell Hill Fire in Arizona. This was the deadliest event for firefighters since 9/11 and the third-highest firefighter death toll attributed to wildfires. A massive wildfire that began near Yosemite Park in California on August 17 had burned over 255,000 acres and was designated as the state's third-largest wildfire. The December 17 fire in Big Sur, Calif., burned 917 acres and more than 30 homes.

The increased severity of fires, combined with continuing development in, and near, forests, puts many more communities at risk and has substantially increased both the difficulty and cost of fire suppression. Expenditures on fire suppression by the U.S. Forest Service alone have exceeded $1 billion in five of the last seven years. And in 2009, nearly $2 billion (48 percent of the agency's budget) is to be targeted at fire management, up from $300 million (13 percent) in 1991.

While no single technology or remedy will prevent tragedies caused by wildfires, any technology or system that could provide for earlier warnings, coordinate responses by firefighters, and improve fire fighter safety would be helpful in the ongoing fight to prevent, contain and manage wildfires.

BRIEF SUMMARY OF THE INVENTION

In a preferred embodiment, a system and method for detecting and managing wildfires is described that includes a plurality of fixed sensors, each operable to detect ambient conditions in the vicinity of the fixed sensor and to relay that information to a central control center. A plurality of mobile sensors are worn by responders and are capable of detecting ambient conditions near the respective responder and conditions of the responder, the plurality of mobile sensors in communication with the central control center. The collective data from the plurality of fixed sensors and the plurality of mobile sensors can be used to determine attributes of the wildfire and to coordinate the responders in response to the wildfire.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Wildfires present many problems for the Forest Service, Park Rangers, firefighters and the like. Among those problems are the inability in many instances to detect fires early, the difficulty managing and tracking large numbers of firefighters over large areas, understanding and tracking a fire as it progresses and detecting when a firefighter is in danger or has been injured.

Figure 1:
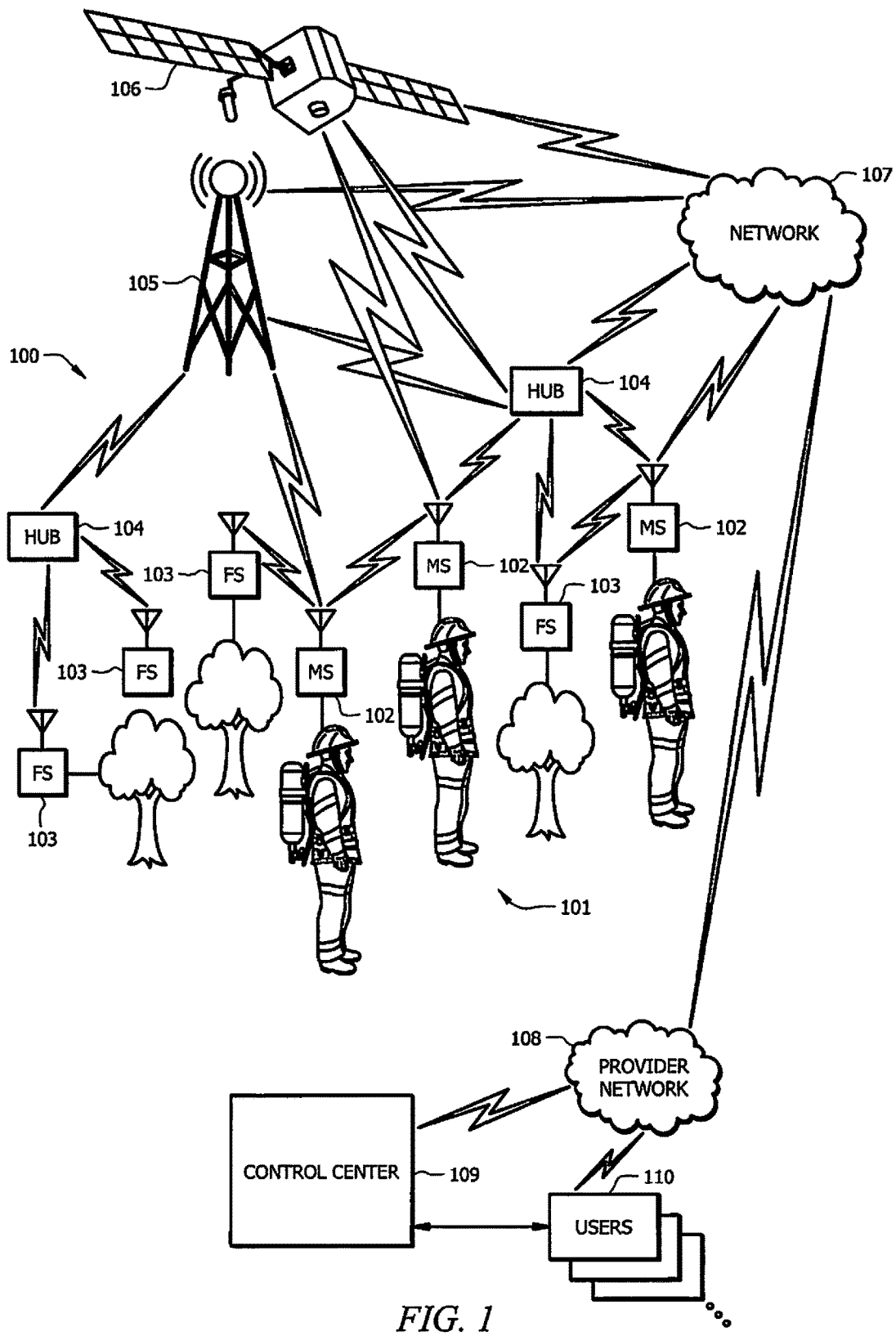
FIG. 1 is a system diagram showing an embodiment of a fire detection system according to the concepts described herein.

A preferred embodiment of a system 100 that addresses each of these problems is shown in FIG. 1. The system can be composed of network 101 of inexpensive sensor units that can be either fixed sensors 103 (FS) or mobile sensors 102 (MS). Each type of sensor can come in different variations depending on the application or circumstances. For example, the fixed and mobile sensors can contain combinations of multiple sensor types that collect information about the surrounding environment. As will be discussed in more detail with reference to FIGS. 2-4, preferred embodiments of the fixed and mobile sensors might include a smoke sensor and a temperature sensor that are able to send messages using one or more of a variety of communication schemes as will be discussed below. In addition to smoke and temperature sensors, other sensors can be included that provide an important data point regarding the surrounding environment. For example, light sensors could be useful in detecting fires during the night hours, acoustic sensors could detect the acoustic signature of a wildfire, etc. Other types of sensors could include wind, humidity, and lightning sensors.

As shown in FIG. 1, the mobile sensors 102 are preferably worn by fire fighters or other personnel or placed on equipment or vehicles. The fixed sensors 103 are preferably distributed in the terrain being monitored. The fixed sensors could be pre-placed in locations, such as in or on trees, on rock formation, or other locations by forest rangers. The fixed sensors could also be deployed from the air by dropping them from drones, helicopters or airplanes. Fixed sensors deployed by dropping them into the forest would be designed to catch in the trees or other foliage for best operation.

The fixed sensors 103 and mobile sensors 102 are designed to communicate with each other and with mobile hubs 104 deployed along with the sensors. Since the sensors would be in remote areas often without cellular service, a preferred method would be to have the sensors form a mesh network by communicating directly with each other. The mesh network 101 allows all of the sensors to send and receive data from a command and control center 109. Given the remote nature of the devices, they could also be configured to use one or more of any usable type of network, such as cellular networks 105, wireless networks 107, such as wifi, or even satellite communications 106. The data can then be sent over a provider network 108 to control center 109. In areas where cellular networks do not exist or are not adequate, mobile wireless networks can be set up to facilitate communications with the sensors 102, 103 and hubs 104. These mobile networks could use temporary antennas, vehicle mounted antenna or airborne antennas using drone, blimps, planes or any other suitable carrier. These networks would then relay the sensor data and sensor location for each of the mobile sensors 102 and fixed sensors 103. The network could be created at the time a fire is detected by bringing in mobile units that could communicate with one or more of the sensors and relay information from all the sensors using the mesh network. While a "mothership" might provide advantages, it is not required as the system could operate solely using the mesh networked devices which relay communications through the network of sensors until a sensor or hub with connectivity to the outside network is found.

The fixed sensors 103 could have their location determined at the time of installation, such as by the ranger or drone, by associating a device id with the deployment location noted by the ranger, drone or other operator. The fixed sensors 103 could also include GPS receivers for location information. The mobile sensors 102 could include location information and might also include other sensors not required in the fixed sensors. A motion, or fall detection, sensor worn by a firefighter could provide and indication that the firefighter was injured or disabled. Smoke and temperature sensors, could provide an indication of the firefighters proximity to the fire. Biometric sensors could provide an indication of the firefighter's health and status. Location sensors, such as GPS, would provide a real-time location for the firefighter and corresponding environmental data. The mobile sensors could also be equipped with RF or cellular voice communication allowing two-way voice transmissions between the firefighter and a control center 109.

Preprogrammed voice commands could be stored in the mobile sensors 103 and triggered by a command from the control center, other authority or as a result of environmental conditions. The voice commands could give directions to the firefighter on preferred escape routes, redeployment or other instructions.

The strength of the system proposed according to the concepts described herein lies in the ability to process environmental and other data from a large number of sensors. The collective data can be used to chart the location, intensity, progress and direction of the wildfire allowing resources to be deployed more efficiently. The data can also be used to show escape routes, as well ingress and egress paths for firefighters. The mobile sensor data would show the real-time location of all of the fire fighting resources and along with the fixed sensor data can be used to make sure those resources are deployed most efficiently. In addition to live streaming data from the sensors, information could also be derived from the loss of signals from the sensors, providing information about where fixed sensors have been destroyed by the fire.

Figure 2:
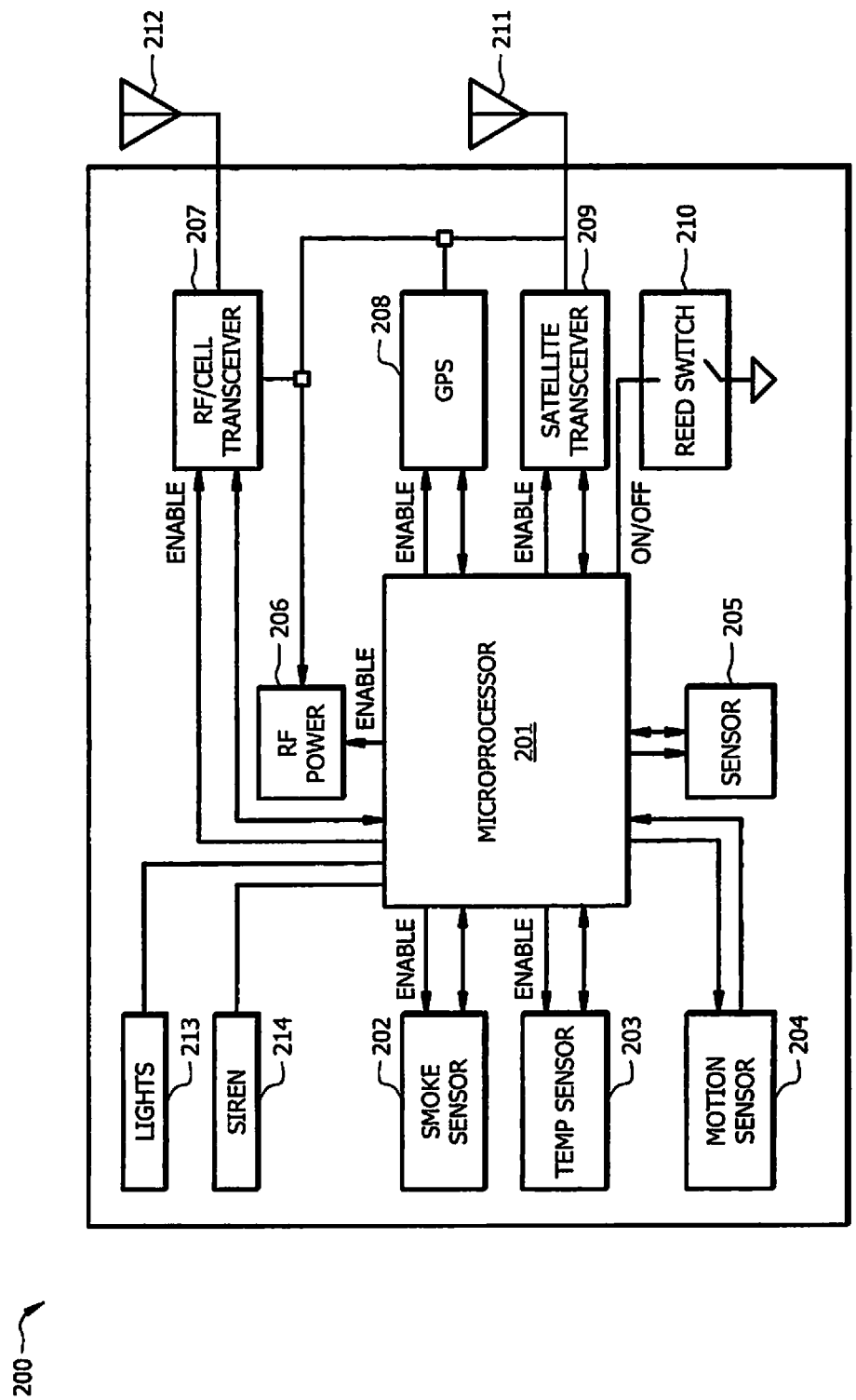
FIG. 2 is a block diagram of an embodiment of a mobile sensor according to the concepts described herein.

Referring now to FIG. 2, and an embodiment of a mobile sensor device 102 from FIG. 1 is shown. The device 200 includes a microprocessor 201 and memory to store data and programming information. The device 200 also includes one or more transmitters or transceivers, such as RF transceiver/cellular transceiver/wifi transceiver 207, a satellite transceiver 209, or other transceiver, to allow the device to communicate in the mesh network with other sensor devices or to communicate with other wireless or cellular networks using antennal 212 and transceiver power supply 206. The satellite transceivers 209 and satellite antenna 211 can allow data transmission and reception and for GPS location. Power can be supplied by batteries or by solar cells or other power supply, or by any combination thereof.

As described above, the devices 200 preferably include one or more sensors, including sensors 202 and 203 that measure the ambient temperature and smoke, respectively. Motion sensors 204 or accelerometers can provide indication that the sensor device 200 has moved, such as from a firefighter involved in a fall. Any other sensor 205 that would provide useful data can also be included. The sensors can be inside the device or can be remote from the device and communicating with the device using a wired or wireless interface, such as Bluetooth or other short range protocol. The units can also include other elements such as lights 213 or sirens 214 that can be activated when fire is detected or when the wearer of a mobile unit appears incapacitated from a fall, smoke inhalation, or other event.

Figure 3:
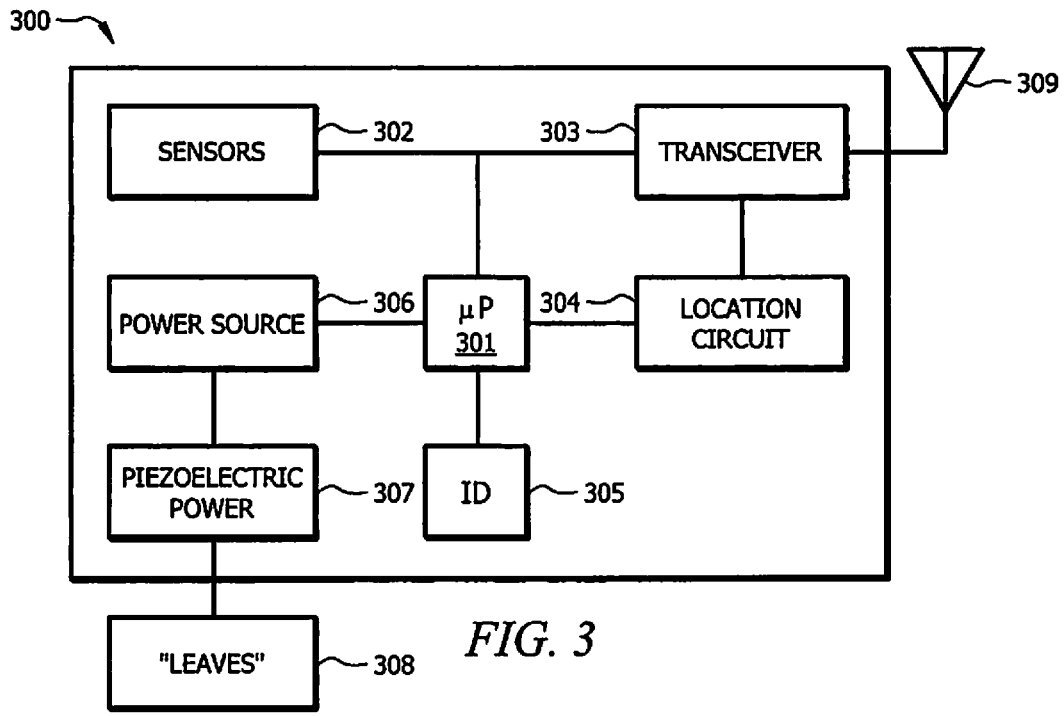
FIG. 3 is a block diagram of an embodiment of a fixed or distributed sensor according to the concepts described herein.

Referring now to FIG. 3, an embodiment of a fixed sensor device 102 from FIG. 1 is shown. Device 300 is preferably a simpler device to mobile sensor 102 having few components and sensors that could be deactivated when not in use to conserve power. Device 300 includes microprocessor 301 and memory to store data and programming information. Sensor or sensors 302 collect data which can be stored and/or transmitted by the device. The device 300 also includes one or more transmitters or transceivers 303 to allow the device to communicate in the mesh network with other sensor devices or to communicate with other wireless or cellular networks using antennal 309. A location circuit 304, such as GPS or cellular location services, can be used to determine the location of device 300 or as described earlier, a device id 305 could be used to identify the device and associate it with a location determined by the deployer of the device. Power source can be batteries or by solar cells or other power supply, or by any combination thereof. In addition, fixed sensor device 300 can include a piezoelectric power circuit 307 that derives power from the motion of external "leaves" 308 on the device that vibrate with wind or other motion source. The piezoelectric power circuit 307 can be used to maintain a charge in the batteries and can allow the device to exist deployed for long periods, such as 5 or more years.

Figure 4:
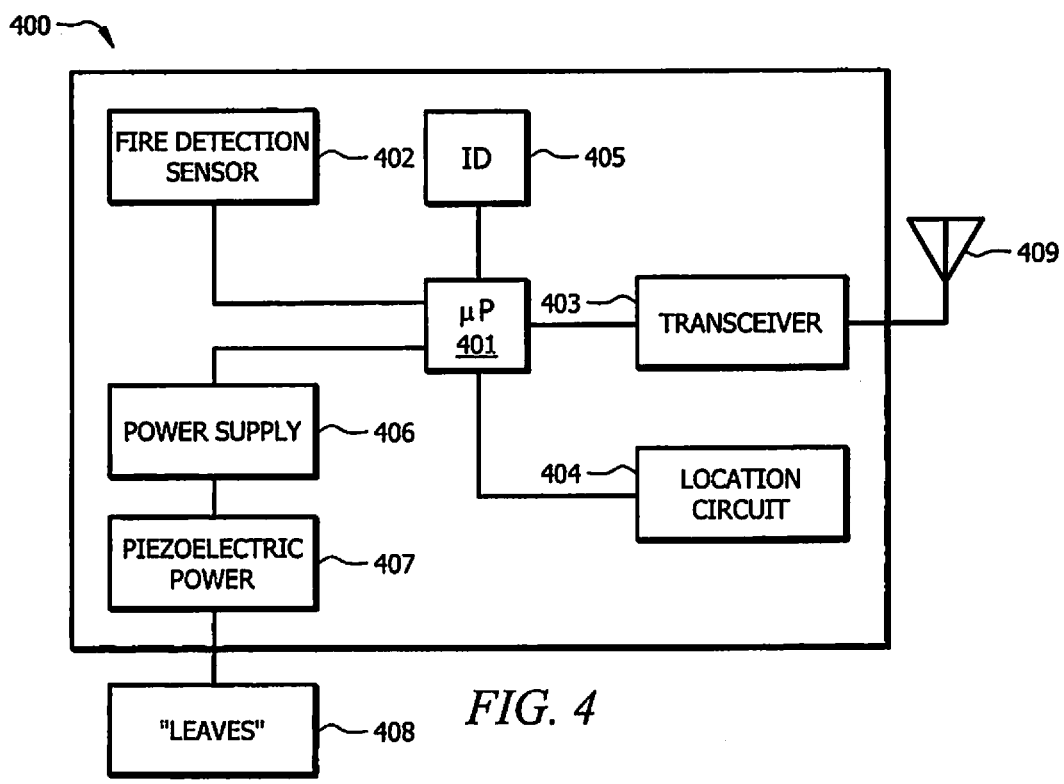
FIG. 4 is a block diagram of an alternate embodiment of a fixed or distributed sensor according to the concepts described herein.

In a preferred embodiment of the present system, the sensors might come in two or more configurations optimized for their intended use. An alternate embodiment of a fixed sensor is shown in FIG. 4. Device 400 is similar to fixed sensor device 300 shown in FIG. 3. It can includes microprocessor 401 and memory to store data and programming information. The device 400 may also include one or more transmitters or transceivers 403 to allow the device to communicate in the mesh network with other sensor devices or to communicate with other wireless or cellular networks using antennal 409. A location circuit 404, such as GPS or cellular location services, may be used to determine the location of device 400 or as described earlier, a device id 405 could be used to identify the device and associate it with a location determined by the deployer of the device. Power source 406 can be batteries or by solar cells, piezoelectric generator 407 with "leaves" 408 or other power supply, or by any combination thereof. Device 400 may be configured with a fire detection sensor 402. In this configuration, the device 400 would lie dormant until fire detection sensor 402 detects a fire. At that time the device would wake up and transmit its id or location before it is consumed by the fire. This type of device would allow the control center to monitor the direction and progress of the fire from the signals from these devices as they are consumed. The device 400 could also be powered by the heat from the fire, further reducing the internal components and cost of the device.

Other configurations of fixed sensors could be employed that would be simpler and contain fewer sensors and transceivers to allow them to better manage power consumption. They could also be programmed differently to activate only when triggered by a remote command or when a sensor has detected a data level above a certain threshold. Mobile units can have more capabilities since they would not normally have the same power constraints as the fixed units. The mobile units can carry more sensors, location detection, lights and sirens, and voice communication capabilities among other things.

Figure 5:
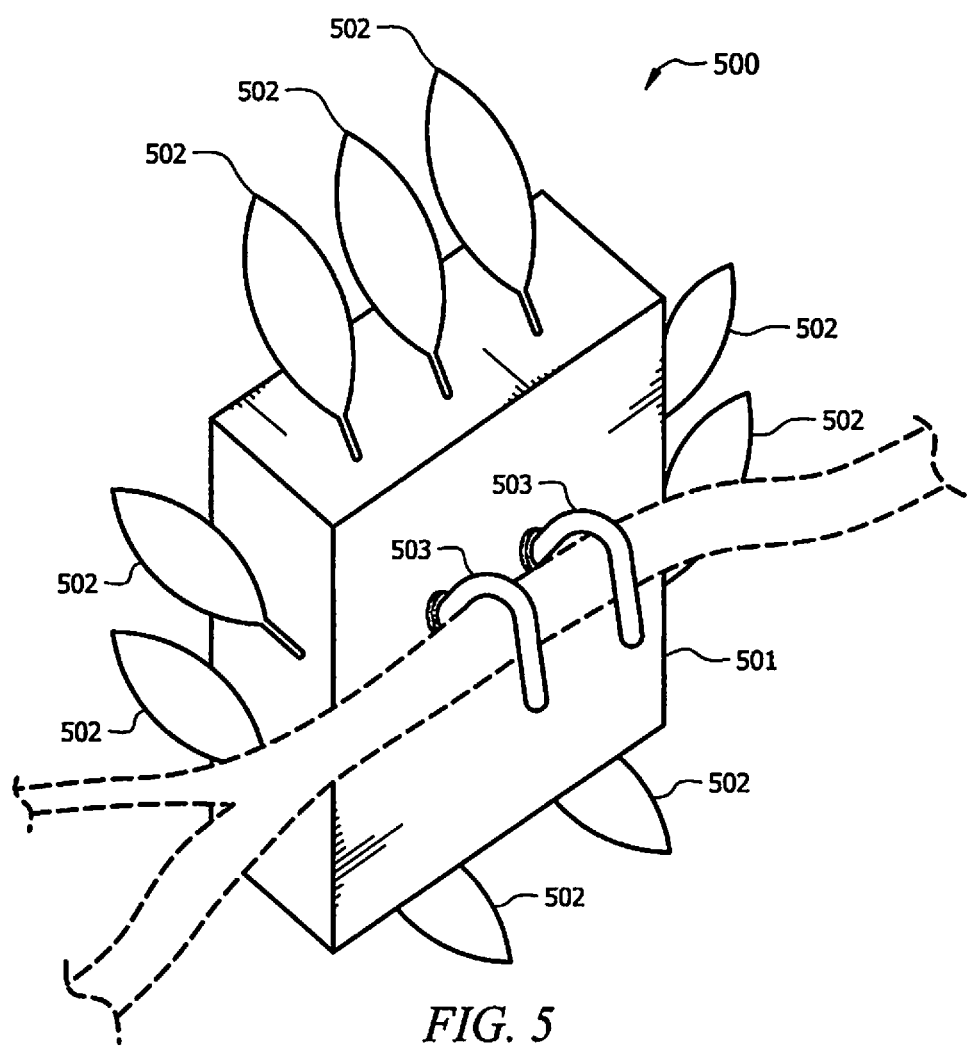
FIG. 5 is a perspective view of a an embodiment of a fixed or distributed sensor according to the concepts described herein.

Referring now to FIG. 5, an embodiment of a fixed sensor form factor is shown. Device 500 includes case 501 holding the components. It may also include piezoelectric power "leaves" 502 that allow power to be generated from the wind. Hooks 503, or other mechanisms, allow the device 500 to catch in trees when deployed from the air or other mechanism without having to be strapped or nailed to trees. In place of hooks 503 any other mechanism that allows device 500 to catch in the branches and leaves or needles of trees can be employed on case 501 without departing from the scope of the concepts described herein.

Many other embodiments of mobile and fixed sensors and hubs can be envisioned that would work with the system as described. Those embodiments could include sensors as part of camping gear or as part of GPS tools for hikers and campers, and embodiments incorporated into tents. Parks may buy sensors and post around edge of park and within park, while ranchers or landowners may want to place around land, especially at edges, report data back to landowner. The devices could include speakers on sensors and have multiple connectivity types. The devices could be powered by any method such as battery, solar, etc, or could be powered by movement, such as wind or connected to animal trackers. Devices could be made to be fireproof and include enough memory to record long periods of data.

Figure 6:
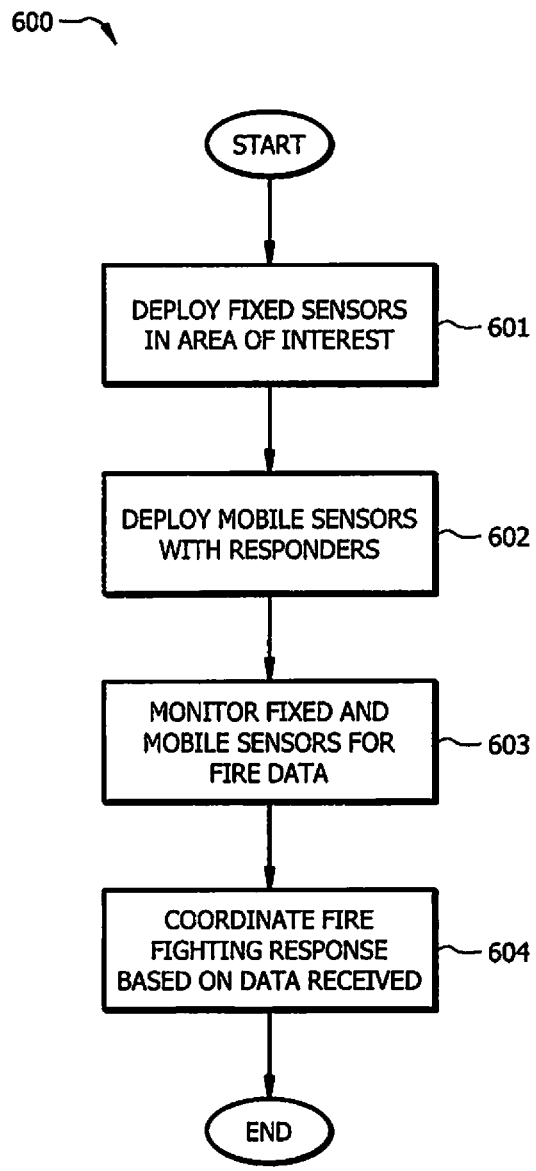
FIG. 6 is a flow chart of an embodiment of a method for detecting and managing wildfires according to the concepts described herein.

Referring now to FIG. 6, a embodiment of a method for detecting and managing wildfires is shown. Method 600 begins with deploying fixed sensors in an area of interest, as shown by step 601. The area may be an area that is prone to wildfires, an area where a wildfire has already been detected or other areas of interest from a fire concern. The fixed sensors can be deployed in advance where they can monitor for fires for years or can be placed in an area where a fire has already been detected to help monitor the fire. The fixed sensors can both help detect new fires, monitor local conditions prone to fire, and collect data on known and existing fires.

In step 602, mobile sensors are carried by responders, such as fire fighters, responding to the detection of a fire. In step 603 the data returned from the fixed and mobile sensors is monitored and used to determine fire conditions. Those conditions can include location, direction of spread, speed of movement and other related conditions. These fire conditions can then be used to coordinate the fire fighting response to the fire and to provide safety information to fire fighters such as warnings of advancing lines of fire and escape routes, as shown by step 604.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A sensor device for detecting and managing wildfires, the sensor device comprising:

one or more of sensors generating sensor data by measuring conditions in the vicinity of the sensor device, the sensor data related to monitoring wildfires;

a microprocessor connected to the one or more of sensors and operable to process and store sensor data; and a transceiver connected to and controlled by the microprocessor;

wherein the sensor device is powered by heat from a fire allowing the sensor device to send data related to the measured conditions using the transceiver before the sensor device is consumed by the fire and wherein the one or more sensors, microprocessor, and transceiver are configured to lie dormant until powered on by heat from the fire.

2. The sensor of claim 1 wherein the one or more sensors include sensors for detecting smoke and measuring temperature.

3. The sensor of claim 1 further comprising an attachment mechanism to allow the sensor device to attach to a tree.

4. The sensor device of claim 1 wherein the location of the sensor device is associated with an ID (identification) of the sensor device when it is deployed.

5. The sensor device of claim 1 further comprising a plurality of hubs that are operable to communicate with the sensor device.

6. The sensor device of claim 1 wherein a plurality of sensor devices form a mesh network to transmit data and messages.

7. The sensor device of claim 1 wherein a command center is operable to receive the collective data from a plurality of sensor devices.

8. The sensor device of claim 7 wherein the command center determines the attributes of the wildfire and coordinates the responders in response to the wildfire.

9. The system of claim 1 wherein the sensor devices are deployed by being dropped into a forest from the air.

10. The system of claim 1 wherein the sensor device is dormant until being powered up by the heat from the fire.

11. A method for detecting and managing wildfires comprising:

deploying a plurality of fixed sensors generating sensor data by measuring conditions in the vicinity of the sensor device, the sensor data related to monitoring wildfires, the plurality of fixed sensors comprising one or more sensors, a microprocessor, and a transceiver, wherein each fixed sensor is powered by heat from a fire allowing the fixed sensor device to send data related to the measured conditions using the transceiver before the sensor device is consumed by the fire, and wherein the one or more sensors, microprocessor, and transceiver are configured to lie dormant until powered on by heat from the fire;

determining attributes of the wildfire from the collective data from the plurality of fixed sensors; and coordinating the activity of responders in response to the wildfire using the collective data.

12. The method of claim 11 further comprising deploying a plurality of mobile sensors with responders, each mobile sensor capable of detecting ambient conditions near the respective responder and conditions of the responder, the plurality of mobile sensors in communication with the central control center.

13. The method of claim 11 wherein the plurality of fixed sensors each include a location determination circuit to determine the location of the respective sensor.

14. The method of claim 11 wherein the location of each fixed sensor is associated with an ID (identification) of the fixed sensor at the time the fixed sensor is deployed.

15. The method of claim 11 wherein the plurality of fixed sensors form a mesh network to transmit data and messages.

16. A system for detecting and managing wildfires comprising:

a plurality of fixed sensors generating sensor data by measuring conditions in the vicinity of the sensor device, the sensor data related to monitoring wildfires, the plurality of fixed sensors comprising one or more sensors, a microprocessor, and a transceiver, each of the plurality of fixed sensors operable to detect ambient conditions wherein each fixed sensor is powered by heat from a fire allowing the fixed sensor to send data related to the ambient conditions using the transceiver before the sensor device is consumed by the fire and to relay that information to a central control center, and wherein the one or more sensors, microprocessor, and transceiver are configured to lie dormant until powered on by heat from the fire; and a plurality of mobile sensors, each worn by a responder and capable of detecting ambient conditions near the respective responder and conditions of the responder, the plurality of mobile sensors in communication with the central control center, wherein the collective data from the plurality of fixed sensors and the plurality of mobile sensors can be used to determine attributes of the wildfire and to coordinate the responders in response to the wildfire.

17. The system of claim 16 wherein the location of each fixed sensor is associated with an ID (identification) of the fixed sensor at the time the fixed sensor is deployed.

18. The system of claim 16 further comprising a plurality of hubs that are operable to communicate with the plurality of fixed sensors and the plurality of mobile sensors.

19. The system of claim 16 wherein the plurality of fixed sensors and the plurality of mobile sensors form a mesh network to transmit data and messages.

20. The system of claim 16 further comprising a command center operable to receive the collective data from the plurality of fixed sensors and the plurality of mobile sensors.

* * * * *